United States Patent [19]

Gutierrez et al.

[11] Patent Number: 4,954,277
[45] Date of Patent: Sep. 4, 1990

[54] LACTONE MODIFIED, ESTERIFIED OR AMINATED ADDITIVES USEFUL IN OLEAGINOUS COMPOSITIONS AND COMPOSITIONS CONTAINING SAME

[75] Inventors: Antonio Gutierrez, Mercerville; Robert D. Lundberg, Bridgewater, both of N.J.

[73] Assignee: Exxon Chemical Patents Inc., Linden, N.J.

[21] Appl. No.: 401,373

[22] Filed: Aug. 31, 1989

Related U.S. Application Data

[62] Division of Ser. No. 916,217, Oct. 7, 1986, Pat. No. 4,866,141.

[51] Int. Cl.[5] .............. C10M 145/00; C10M 149/00; C10M 159/12
[52] U.S. Cl. .............................. 252/49.6; 252/51.5 R; 252/51.5 A; 252/54.6
[58] Field of Search .................................... 252/49.6

[56] References Cited

U.S. PATENT DOCUMENTS

| | | |
|---|---|---|
| Re. 26,330 | 1/1968 | Colfer ........................ 208/48 |
| Re. 26,433 | 12/1968 | Colfer . |
| 2,290,154 | 7/1942 | Blair, Jr. ..................... 252/344 |
| 2,568,619 | 9/1951 | Gregory ...................... 260/484 |
| 2,638,449 | 5/1953 | White et al. ................ 252/51.5 |
| 2,767,144 | 10/1956 | Gottshall et al. ............ 252/57 |
| 2,890,208 | 6/1959 | Young et al. ............... 260/78.3 |
| 3,025,323 | 3/1962 | Rose et al. .................. 260/561 |
| 3,062,631 | 11/1962 | Thompson ...................... 44/71 |
| 3,087,936 | 4/1963 | Lesuer ........................ 260/326.3 |
| 3,131,150 | 4/1964 | Stuart et al. .................. 252/34.7 |
| 3,154,560 | 10/1964 | Kirkwood .................... 260/326.3 |
| 3,169,945 | 2/1965 | Hostettler et al. ............ 260/78.3 |
| 3,172,892 | 3/1965 | Lesuer et al. ................ 260/326.5 |
| 3,198,736 | 8/1965 | Henderson .................... 252/46.7 |
| 3,202,678 | 8/1965 | Stuart et al. ................. 260/326.5 |
| 3,215,707 | 11/1965 | Rease et al. ................. 260/326.3 |
| 3,219,666 | 11/1965 | Norman et al. .............. 260/268 |
| 3,231,587 | 11/1966 | Rease et al. ................. 260/346.8 |
| 3,254,025 | 5/1966 | Lesuer . |
| 3,269,946 | 8/1966 | Wiese ......................... 252/32.5 |
| 3,272,743 | 9/1966 | Lesuer ........................ 252/32.5 |
| 3,272,746 | 9/1966 | Lesuer ........................ 252/47.5 |
| 3,278,550 | 10/1966 | Lesuer et al. ................ 260/326.3 |
| 3,284,409 | 11/1966 | Dorer ......................... 252/49.9 |
| 3,284,417 | 11/1966 | Hostettler et al. ............ 260/78.3 |
| 3,288,714 | 11/1966 | Osuch .......................... 252/57 |
| 3,306,908 | 2/1967 | Lesuer . |
| 3,325,484 | 6/1967 | Deghenghi et al. .......... 260/239.55 |
| 3,361,673 | 1/1968 | Stuart et al. .................. 252/51.5 |
| 3,367,895 | 2/1968 | Clark .......................... 260/22 |
| 3,379,693 | 4/1968 | Hostettler et al. ............ 260/77.5 |
| 3,381,022 | 4/1968 | Lesuer ........................ 260/404.8 |
| 3,390,086 | 6/1968 | O'Halloran .................. 252/47.5 |
| 3,401,118 | 9/1968 | Benoit et al. ................. 252/51.5 |
| 3,403,102 | 9/1968 | Lesuer ........................ 252/49.8 |
| 3,436,463 | 4/1969 | Mayhew et al. ............. 424/320 |
| 3,438,943 | 4/1969 | Miranda et al. ............. 260/75 |
| 3,455,827 | 7/1969 | Mehmedbasich et al. ... 252/32.7 |
| 3,488,049 | 6/1969 | Preuss et al. ................. 252/51.5 |
| 3,493,568 | 2/1970 | Levy et al. .................... 260/244 |
| 3,522,179 | 7/1970 | Lesuer ......................... 252/51.5 |
| 3,562,159 | 2/1971 | Mastin ......................... 252/32.7 |
| 3,576,743 | 4/1971 | Widmer et al. ............... 252/51.5 |
| 3,632,510 | 1/1972 | Lesuer ......................... 252/35 |
| 3,684,771 | 8/1972 | Braun .......................... 260/77 |
| 3,699,165 | 10/1972 | Albers et al. ................ 260/561 B |
| 3,708,522 | 1/1973 | Lesuer ........................ 260/485 |
| 3,792,061 | 2/1974 | Zecher et al. ................ 260/326 |
| 3,799,877 | 3/1974 | Nnadi et al. .................. 252/51.5 R |
| 3,836,470 | 9/1974 | Miller .......................... 252/51.5 |
| 3,836,471 | 9/1974 | Miller .......................... 252/51.5 |
| 3,838,050 | 9/1974 | Miller .......................... 252/40.5 |
| 3,838,052 | 9/1974 | Miller .......................... 252/56 R |
| 3,879,388 | 4/1975 | Miller .......................... 252/56 R |
| 3,912,764 | 10/1975 | Palmer ........................ 260/346.8 |
| 3,927,041 | 12/1975 | Cencle et al. ................ 260/346.8 |
| 3,950,341 | 4/1976 | Okamoto et al. ............ 260/268 |
| 4,017,406 | 4/1977 | Brois et al. .................. 252/51.5 A |
| 4,062,786 | 12/1977 | Brois et al. .................. 252/51.5 R |
| 4,086,294 | 4/1978 | Koleske et al. .............. 260/834 |
| 4,102,798 | 7/1978 | Ryer et al. ................... 252/51.5 R |
| 4,110,349 | 9/1978 | Buckler et al. ............... 260/346.74 |
| 4,113,639 | 9/1978 | Lonstrup et al. ............. 252/51.5 A |
| 4,116,875 | 9/1978 | Nnadi et al. ................. 252/49.7 |
| 4,116,876 | 9/1978 | Brois et al. .................. 252/49.6 |
| 4,123,373 | 10/1978 | Brois et al. .................. 252/48.6 |
| 4,151,173 | 3/1979 | Vogel .......................... 260/326.5 F |

(List continued on text page.)

FOREIGN PATENT DOCUMENTS

| | | |
|---|---|---|
| 012320 | 1/1961 | Canada . |
| 202024 | 11/1986 | European Pat. Off. . |
| 1054370 | 1/1967 | United Kingdom . |

Primary Examiner—William R. Dixon, Jr.
Assistant Examiner—Jerry D. Johnson
Attorney, Agent, or Firm—J. B. Murray, Jr.

[57] ABSTRACT

$C_5$–$C_9$ lactone derived materials are made by simultaneously reacting (a) a $C_5$–$C_9$ lactone with (b) a polyamine, a polyol or an amino alcohol and (c) a hydrocarbyl substituted $C_4$–$C_{10}$ monounsaturated dicarboxylic acid producing material, e.g., a polyisobutenyl succinimide, which preferably was made by reacting a polymer of a $C_2$ to $C_{10}$ monoolefin, preferably polyisobutylene, having a molecular weight of about 300 to 10,000 with a $C_4$ to $C_{10}$ monounsaturated acid, anhydride or ester, preferably maleic anhydride, such that there are 0.7 to 2.0 dicarboxylic acid producing moieties per molecule of said olefin polymer used in the reaction mixture. The resulting lactone derived materials, which may be post-treated, for example, with a boron compound, are useful, per se, as oil soluble dispersant additives, and are useful in fuel and lubricating oil compositions including concentrates containing the additives.

90 Claims, No Drawings

U.S. PATENT DOCUMENTS

| | | | |
|---|---|---|---|
| 4,169,836 | 10/1979 | Ryer et al. | 548/238 |
| 4,176,073 | 11/1979 | Ryer et al. | 252/32.7 |
| 4,234,435 | 11/1980 | Meinhardt et al. | 252/51.5 A |
| 4,247,671 | 1/1981 | Reitz et al. | 526/260 |
| 4,261,871 | 4/1981 | Smith et al. | 260/18 EP |
| 4,263,153 | 4/1981 | Davis et al. | 252/475 |
| 4,292,184 | 9/1981 | Brois et al. | 252/46.3 |
| 4,362,635 | 12/1982 | Dhein et al. | 252/56 S |
| 4,379,914 | 4/1983 | Lundberg | 528/354 |
| 4,388,471 | 6/1983 | Wollenberg | 549/255 |
| 4,397,750 | 8/1983 | Chibnik | |
| 4,448,905 | 5/1984 | Lin et al. | 521/164 |
| 4,450,281 | 5/1984 | Wollenberg | 549/255 |
| 4,463,168 | 7/1984 | Lundberg | 528/355 |
| 4,486,326 | 12/1984 | Guitierrez et al. | 252/49.7 |
| 4,502,970 | 3/1985 | Schetelich et al. | 252/32.7 E |
| 4,517,104 | 5/1985 | Bloch et al. | 252/51.5 A |
| 4,532,058 | 7/1985 | Chafetz | 252/51.5 A |
| 4,536,547 | 8/1985 | Lundberg et al. | 525/186 |
| 4,540,809 | 9/1985 | Yokoshima et al. | 560/185 |
| 4,584,117 | 4/1986 | Wollenberg | 252/51.5 A |
| 4,585,566 | 4/1986 | Wollenberg | 252/51.5 A |
| 4,612,132 | 9/1986 | Wollenberg | 252/51.5 A |
| 4,614,603 | 9/1986 | Wollenberg | 252/51.5 A |
| 4,617,138 | 10/1986 | Wollenberg | 252/51.5 A |
| 4,624,681 | 11/1986 | Wollenberg | 44/63 |
| 4,645,515 | 1/1987 | Wollenberg | 44/63 |
| 4,647,390 | 3/1987 | Buckley, III et al. | 252/31.5 |
| 4,663,062 | 5/1987 | Wollenberg | 252/47.5 |
| 4,666,459 | 5/1987 | Wollenberg | 44/56 |
| 4,666,460 | 5/1987 | Wollenberg | 44/63 |
| 4,668,246 | 5/1987 | Wollenberg | 44/63 |
| 4,680,129 | 7/1987 | Plavac | 252/51.5 A |
| 4,741,848 | 5/1988 | Koch et al. | 252/49.6 |
| 4,866,135 | 9/1989 | Gutierrez et al. | 252/49.6 |
| 4,866,139 | 9/1989 | Gutierrez et al. | 252/49.6 |
| 4,866,140 | 9/1989 | Gutierrez et al. | 252/49.6 |
| 4,866,141 | 9/1989 | Gutierrez et al. | 252/51 |

LACTONE MODIFIED, ESTERIFIED OR AMINATED ADDITIVES USEFUL IN OLEAGINOUS COMPOSITIONS AND COMPOSITIONS CONTAINING SAME

CROSS-REFERENCE TO RELATED APPLICATION:

This application is a Rule 60 Divisional of Ser. No. 916,217, filed Oct. 7, 1986, now U.S. Pat. No. 4,866,141.

RELATED U.S. APPLICATIONS

This application is related to the following applications filed by the inventors herein: Ser. No. 916,218, filed Oct. 7, 1986 Ser. No. 916,114, filed Oct. 7, 1986, now U.S. Pat. No. 4,866,193; Ser. No. 916,113, filed Oct. 7, 1986, now U.S. Pat. No. 4,866,140; Ser. No. 916,287, filed Oct. 7, 1986, now U.S. Pat. No. 4,866,135; Ser. No. 916,108 filed Oct. 7, 1986 and Ser. No. 916,303, filed Oct. 7, 1986, now U.S. Pat. No. 4,866,142. All of these related applications are expressly incorporated herein by reference in their entirety.

BACKGROUND OF THE INVENTION

1. Field of the Invention

This invention relates to oil soluble dispersant additives useful in fuel and lubricating oil compositions, including concentrates containing said additives, and methods for their manufacture and use. The dispersant additives are poly ($C_5$–$C_9$ lactone) adducts which have been prepared by simultaneously reacting a (1) $C_5$–$C_9$ lactone with (2) a polyamine, a polyol or an amino alcohol and (3) and with a dicarboxylic acid material which has been substituted with a high molecular weight hydrocarbon group. The high molecular weight hydrocarbon group has a number average molecular weight ($M_n$) of about 300 to about 10,000. The additives will have a ratio (functionality) of about .70 to about 2.0 dicarboxylic acid producing moieties for each equivalent weight of the high molecular weight hydrocarbon therein.

2. Prior Art

Polyalkylene substituted $C_4$–$C_{10}$ dicarboxylic acid and anhydride adducts with polyols and polyamines are well known lubricating additives. These agents act to keep sludge and varnish dispersed in engine oils and have been very successful commercially.

It is also known that polymers of 6 to 10 membered lactones such as valerolactone or epsiloncaprolactone (hereinafter caprolactone or E-caprolactone), can be prepared by reacting the lactone monomer with a hydroxyl or amine initiator. When reacting E-caprolactone, for example, the polymerization reaction may be illustrated by the following equations:

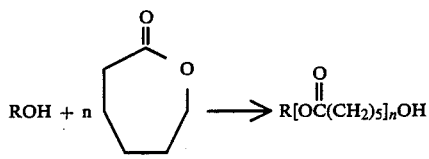

Eq. 1

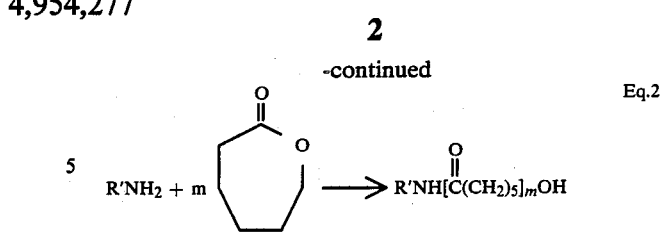

The reactions are known to be catalyzed by various esterification catalysts such as stannous octanoate, and a variety of different molecular weight products are feasible depending upon the ratio of lactone to initiator. Molecular weights on the order of form a few hundred up to about 5,000 are reproducably achievable.

Caprolactone can also be polymerized to a very high molecular weight e.g., on the order of 100,000 or more. Typically such high molecular weight polymers do not employ initiators and preservation of functionality is not a requirement.

It is also known to react a lactone such as E-caprolactone with a polyol to form polyesters having terminal hydroxyl groups which are useful as plasticizers.

It has now been found that improved oil soluble dispersant additives, useful in fuel and lubricating oil compositions, including concentrates containing the additives, can be prepared by first reacting a 6 to 10 membered lactone with either a polyamine, a polyol or an amino alcohol to form an intermediate adduct, and then reacting the intermediate adduct with a known class of oil soluble dispersants, namely: dicarboxylic acids, anhydrides, esters, etc. that have been substituted with a high molecular weight hydrocarbon group. A typical example of one such known oil soluble dispersant is a polyalkylene succinic anhydride, wherein the polyalkylene moiety has a number average molecular weight of about 300 to about 10,000 and wherein the ratio (functionality) of succinic acid producing moieties to each equivalent weight of the polyalkylene moiety is from about 0.70 to about 2.0.

While there are a number of prior art disclosures relating to adducts of lactones and polyols and/or amino alcohols, to polyalkenyl succinic acid or anhydride type dispersants, and to lactone polymerization reactions, in general, little or no prior art of direct pertinence appears to have surfaced in regard to the present dispersants. Exemplary of the patent literature which relates to lactone polymerization processes and/or to oil soluble dispersant additives are the following U.S. Pat. Nos.: U.S. Pat. No. 4,362,635 discloses synthetic ester oils which are esterification products of monoalcohols and dicarboxylic acids or of polyhydric alcohols and monocarboxylic acids respectively, containing 5 to 45% by weight of units of hydroxycarboxylic acids obtained from aliphatic alcohols, aliphatic, cycloaliphatic or aromatic carboxylic acids, and lactones of aliphatic $C_5$–$C_{12}$ hydrocarboxylic acids. The synthetic ester oils are suitable for the preparation of lubricants and lubricant compositions.

U.S. Pat. No. 2,890,208 discloses a process for polymerizing lactones to form lactone polyesters that are useful as plasticizers.

U.S. Pat. No. 3,950,341 relates to oil soluble detergent dispersants which are prepared by reacting a polyalkenyl succinic acid or its anhydride with a hindered alcohol such as pentaerythritol, and then with an amine.

U.S. Pat. No. 4,062,786 and its continuationin-part (U.S. Pat. No. 4,292,184) disclose lactone oxazoline reaction products of hydrocarbon substituted lactone carboxylic acids such as polybutyl lactone carboxylic acid, with a 2,2-disubstituted- 2-amino-1-alkanol such as tris(hydroxymethyl) amino-methane (THAM). The reaction products and their derivatives are disclosed as being useful additives in oleaginous compositions such as sludge dispersants for lubricating oil.

U.S. Pat. No. 4,169,836 discloses reacting hydrocarbon substituted dicarboxylic acids, esters, or anhydrides, for example, octadecenylsuccinic anhydride and polyisobutenyl succinic anhydride with 2,2-disubstituted-2-amino-l-alkanols, for example, THAM, to form oxazoline products which are useful as additives in oleaginous compositions, such as sludge dispersants for lubricating oil.

U.S. Pat. No. 4,234,435 discloses as oil additives, polyalkylene substituted dicarboxylic acids derived from polyalkylenes having a $M_n$ of 1,300 to 5,000 and containing at least 1.3 dicarboxylic acid groups per polyalkylene. In Example 34 of this patent, a polyiosbutene-substituted succinic acylating agent is reacted with caprolactone in the presence of mineral oil and sodium hydroxide.

U.S. Pat. No. 3,381,022 relates to ester derivatives of substantially saturated polymerized olefin-substituted succinic acid wherein the polymerized olefin substitutuent contains at least about 50 aliphatic carbon atoms and host a molecular weight of about 700 to 5,000. The esters include the acidic esters, diesters, and metal salt esters wherein the ester moiety is derived from monohydric and polyhydric alcohols, phenols and naphthols. The ester derivatives are useful as additives in lubricating compositions, fuels, hydrocarbon oils and power transmission fluids. A related application, i.e., U.S. Pat. No. 3,522,179, relates to lubricating compositions comprising a major amount of a lubricating oil and a minor proportion of an ester derivative of a hydrocarbon-substituted succinic acid sufficient to improve the detergency of the lubricating composition. The ester derivatives are similar to those described in U.S. Pat. No. 3,381,022 and contain at least about 50 aliphatic carbon atoms. The hydrocarbon substituent may be derived from a polymerized lower monoolefin having a molecular weight of from about 700 to about 5,000.

U.S. Pat. No. 4,379,914 and its continuationin-part (U.S. Pat. No. 4,463,168) disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acidcontaining polymers to form amine-neutralized, sulfonated derivatives which can be combined with an alkyl benzene sulfonic acid to give a surfactant which contains ester groups, hydroxyl groups and amine-neutralized sulfonate groups.

U.S. Pat. No. 3,169,945 discloses the preparation of lactone polyesters which are useful as plasticizers and as intermediates for preparing elastomers and foams. The polyesters can be prepared by reacting a lactone such a E-caprolactone with an initiator such as an alcohol, amine or amino alcohol. A similar disclosure is contained in U.S. Pat. No. 3,284,417.

U.S. Pat. No. 3,025,323 relates to a class of diols which are derived through the action of omega-lactones on the primary amine groups of monoalkanolamines and on the amine groups of primary diamines. The compounds disclosed in this patent are useful as intermediates in the synthesis of polymers and as softeners and sizes for paper, leather and other porous materials.

U.S. Pat. No. 3,436,463 discloses N-substituted-gamma hydroxycarboxylic acid amides which are useful as nematocide and insecticides. The compounds of this patent are prepared by reacting an organic primary amine with a lactone such as gamma-butyrolactone or gamma-valerolactone.

U.S. Pat. No. 4,532,058 discloses as a motor oil dispersant, a spirodilactone condensation product formed by heating alkenyl succinic anhydrides in the presence of a basic catalyst, and then heating the resulting bicyclic spirodilactone condensation product with a polyamine or polyamine alcohol. It should be emphasized that this patent describes the intermolecular decarboxylation of an alkenyl succinic anhydride at elevated temperatures to form a condensation product and carbon dioxide as a byproduct. This prior art is not concerned with polymerizable lactones which are the subject of the instant invention.

U.S. Pat. No. 3,448,049 relates to lubricating oil additives based on polyolefinic succinate derivatives which are prepared by reacting an alkenyl succinic anhydride or an alkenyl succinic anhydride derivative with at least one hydroxy compound which also contains amide groups.

U.S. Pat. No. 2,638,449 discloses lubricating oil additives derived from alkenyl succinic anhydride esters of hydroxy compounds containing fatty acid amide groups.

U.S. Pat. No. 4,540,809 discloses acrylate esters of dipentaerythritol-caprolactone condensates. The esters are useful as a vehicle for paints and can be hardened by ionizing radiation or thermal means.

U.S. Pat. No. 4,086,294 discloses water soluble polycaprolactone-epoxide adducts which are produced by reacting a polycaprolactone polyol, a diepoxide and an anhydride of a polycarboxylic acid, such as substituted or unsubstituted succinic anhydride. The polycaprolactone-epoxide adducts are useful in the preparation of aqueous coating compositions. Similar polycaprolactone-epoxide adducts are disclosed in U.S. Pat. No. 4,261,871.

U.S. Pat. No. 3,438,943 relates to polyesters which are derived from oxazoline polyols and which are useful in water-thinned paints. The oxazoline polyols are prepared by reacting an acid or acid derivative and a polyhydroxy amine such as THAM.

U.S. Pat. No. 4,397,750 teaches the preparation of hydroxy substituted pyrrolidone esters from butyrolactones and polyhydroxyamines. Corresponding hydroxyamide side-products are also disclosed. The disclosed esters are useful as additives for lubricants and fuels.

U.S. Pat. No. 4,247,671 discloses the preparation of oxazoline alcohols via the condensation of, for example, caprolactone with an appropriate amine, for example, 2-amino-2-methyl-1propanol. The oxazoline alcohols can be used to prepare oxazoline-containing polymer coatings. Analogous adducts prepared from butyrolactone and monohydroxy amino alcohols are disclosed in U.S. Pat. No. 4,448,905.

U.S. Pat. No. 3,493,568 discloses diol amides prepared from caprolactone and a monohydroxy amino alcohol. The diol amides can be cyclodehydrated to form oxazolines and oxazines which can be polymerized to yield crosslinked polymeric structures.

U.S. Pat. No. 4,017,406 discloses ester derivatives of long chain dicarboxylic anhydrides such as octadecenyl and polyisobutenylsuccinic andyrides and aldehyde/-THAM adducts for use as additives for oleaginous compositions.

All of the above discussed patents are expressly incorporated herein by reference in their entirety.

Additional exemplary prior art disclosures, which are expressly incorporated herein by reference in their entirety are U.S. Pat. Nos. 2,290,154; 2,568,619; 2,767,144; 3,062,631; 3,087,936; 3,131,150; 3,154,560; 3,172,892; 3,198,736; 3,202,678; 3,215,707; 3,219,666; 3,231,587; 3,254,025; 3,325,484; 3,269,946; 3,272,743; 3,272,746; 3,278,550; 3,284,409 3,284,417; 3,288,714; 3,306,908; 3,361,673; 3,367,895; 3,379,693; 3,390,086; 3,401,118; 3,403,102; 3,455,827; 3,562,159; 3,576,743; 3,632,510; 3,699,165; 3,684,771; 3,708,522; 3,792,061; 3,799,877; 3,836,470; 3,836,471; 3,838,050; 3,838,052; 3,879,308; 3,912,764; 3,927,041; 4,062,786; 4,102,798; 4,110,349; 4,113,639; 4,116,875; 4,116,876; 4,123,373; 4,151,173; 4,167,073; 4,169,836; 4,263,153; 4,292,184; 4,379,914; 4,463,168; 4,486,326; 4,502,970; 4,517,104; 4,532,058; 4,536,547; Reissue 26433 and Reissue 26,330.

SUMMARY OF THE INVENTION

Despite the efficacy of prior art dispersant and oleaginous compositions, there is a need for more efficient and less costly dispersants which can either perform better, or perform well at lower dispersant levels. Accordingly, it is a principal object of this invention to provide novel lactone adduct based dispersants which are effective, and readily prepared under typical dispersant manufacturing conditions.

Another object is to provide a novel class of poly ($C_5-C_9$ lactone) adduct dispersants.

Another object is to provide a process for preparing efficient dispersants by simultaneously reacting a hydrocarbyl substituted dicarboxylic acid, anhydride, etc. with a $C_5-C_9$ lactone and with a polyamine, a polyol, an amino alcohol or a mixture thereof.

A further object is to provide lubricant compositions and concentrates containing the novel $C_5-C_9$ lactone based dispersants of this invention.

Yet another object is to provide a novel class of oil soluble dispersants from polyalkylene substituted acylating agents which have at least one group in their structure which is reactive with $C_5-C_9$ lactone and/or a polyamine, a polyol, an amino alcohol, or a mixture thereof.

Still another object is to provide metal complexes and other post-treatment derivatives, e.g. borated derivatives, of the novel $C_5-C_9$ lactone based dispersants of this invention.

Still another object is to provide metal complexes and other post-treated derivatives, e.g., borated derivatives, of the novel poly ($C_5-C_9$) lactone adduct dispersants of this invention, as well as lubricant compositions and concentrates containing such post-treated derivatives.

The manner in which these and other objects can be achieved will be apparent from the detailed description of the invention which appears hereinbelow.

In one aspect of this invention, one or more of the above objects can be achieved by simultaneously reacting a $C_5-C_9$ lactone with a polyamine and with a polyolefin substituted dicarboxylic acylating agent, wherein the polyolefin has a number average molecular weight of about 300 to about 10,000, and wherein the acylating agent contains from about 0.70 to about 2.0 dicarboxylic acid producing moieties, preferably acid anhydride moieties, per equivalent weight of polyolefin.

In another aspect, one or more of the objects of this invention can be achieved by heating a $C_5-C_9$ lactone such as E-caprolactone at a temperature of at least about 30° C., and preferably from about 75° C. to about 180° C. with a mixture of a polyamine and a polyalkylene succinic acid or anhydride wherein the polyalkylene is characterized by a number average molecular weight of about 300 10,000, and wherein the polyalkylene succinic acid or anhydride is characterized by the presence within its structure of from about 0.7 to about 2.0 succinic acid or succinic acid derivative moieties for each equivalent weight of polyalkylene; and, in a further aspect, one or more objects of this invention are achieved by providing the $C_5-C_9$ lactone reaction products produced by such a process.

One or more objects of this invention can be illustrated in connection with the simultaneous reaction between a $C_5-C_9$ lactone such as E-caprolactone, a polyamine such as tetraethylene pentamine (TEPA) and a polyisobutenyl succinimideamide dispersant.

Still other objects can be illustrated in connection with the simultaneous reaction between E-caprolactone, a polyol such as pentaerythritol, and a PIBSA to form a PIBSA-polyol-caprolactone dispersant.

Still other objects can be illustrated in connection with the simultaneous reaction between E-caprolactone, an amino alcohol such as 2-amino-2-(hydroxymethyl)-1,3-propanediol (THAM) and a PIBSA to form a PIBSA-bis ester oxazoline dispersant. The novel products of this invention are useful per se as an additive, e.g., a dispersant additive, for example, in the same manner as disclosed in U.S. Pat. No. 3,219,666 where prior art derivatives of polyalkenyl succinic acids and nitrogen compounds are used as dispersant/detergents in lubricants, especially lubricants intended for use in the crankcase of internal combustion engines, gears, and power transmitting units. Accordingly, one or more objects of this invention are achieved by providing lubricating oil compositions, e.g., automatic transmission fluids, heavy duty oils suitable for use in the crankcases of gasoline and diesel engines, etc. containing the novel $C_5-C_9$ lactone based products of this invention. Such lubricating oil compositions may contain additional additives such as viscosity index improves, antioxidants, corrosion inhibitors, detergents, pour depressants, antiwear agents, etc.

Still further objects are achieved by providing concentrate compositions comprising from about 20 to about 80 weight % of a normally liquid, substantially inert, organic solvent/diluent, e.g., mineral lubricating oil, or other suitable solvent/diluent and from about 20 to about 80 weight % of a $C_5-C_9$ lactone based dispersant, as mentioned above and described in more detail hereinafter.

DESCRIPTION OF THE PREFERRED EMBODIMENTS

The Lactone Material

Lactone compounds which may be used to prepare the dispersants of this invention include polymerizable lactones having at least five carbon atoms in the lactone ring, e.g., 5 to 9 carbon atoms. The lactone may be substituted or unsubstituted and the substituents, if any may comprise, for example, alkyl, aryl, aralkyl, cycloalkyl, alkoxy or other groups which would not interfere with the ring opening reaction and adduct formation. The preferred lactones have no more than two substituent groups, and the more preferred lactones are unsubstituted.

Non-limiting examples of the useful lactones include delta-valerolactone, methyl-deltavalero-lactone, E-caprolactone, methyl-E-caprolactone, dimethyl-E-caprolactone, methoxy-E-caprolactone, cyclohexyl-E-caprolactone, methylbenzyl-E- caprolactone, caprylolactone, methylcaprylolactone, and the like, with E-caprolactone being particularly preferred.

The Polyamine Material

Useful amine compounds for reaction with the lactone material and with the hydrocarbyl substituted dicarboxylic acid material include polyamines of about 2 to 60, e.g. 3 to 20, most preferably 3 to 10, total carbon atoms in the molecule. These amines may be hydrocarbyl amines or may be hydrocarbyl amines including other noninterfering groups, e.g., alkoxy groups, amide groups, nitrile groups, imidazoline groups, and the like. Preferred amines are aliphatic saturated amines, including those of the general formula:

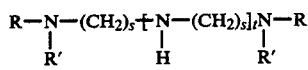

wherein R and R' are independently selected from the group consisting of hydrogen: $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals, each s is the same or a different number of from 2 to 6, preferably 2 to 4; and t is a number of from 0 to 10, preferable 2 to 7. If t=0, then at least one of R or R' must be H such that there are at least two of either primary or secondary amino groups.

Non-limiting examples of suitable amine compounds include: 1,2-diaminoethane, 1,3-diaminopropane, 1,4-diaminobutane, 1,6-diaminohexane, polyethylene amines such as diethylene triamine, triethylene tetramine, tetraethylene pentamine, polypropylene amines such as 1,2-propylene diamine, di-(1,2 propylene) triamine, di-(1,3-propylene)triamine, N,N-dimethyl-1-1,3-diaminopropane, N,N-di-(2-aminoethyl)ethylene diamine, N-dodecyl-1-1,3-propane diamine, di-,and tri-tallow amines, amino morpholines such as N-(3-aminopropyl morpholine, etc.

Other useful amine compounds include: alicylic diamines such as 1,4-di(aminomethyl) cyclohexane, and heterocyclic compounds such as imidazolines, morpholines and N-aminolakyl piperazines of the general formula:

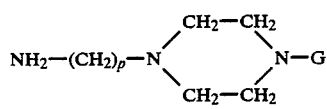

wherein G is independently selected from the group consisting hydrogen and omega (nontertiary)aminoalkylene radicals of from 1 to 3 carbon atoms, and p is a number of from 1 to 4. Nonlimiting examples of such amines include 2-pentadecyl imidazoline, N-(2-aminoethyl) piperazine, etc.

Commercial mixtures of amine compounds advantageously may be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. A low cost mixture of poly(ethyleneamine) compounds averaging about 5 to 7 nitrogen atoms per molecule are available commercially under trade names as "Polyamine H", "Polyamine 400", "Dow Polyamine E-100", etc.

Useful amines also include polyoxalkylene polyamines such as those of the formulas:

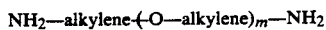

where m has a value of about 3 to 70 and preferably 10 to 35: and

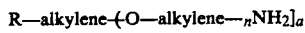

where n has a value of about 1 to 40 with the provision that the sum of all the n's is from about 3 to about 70 and preferably from about 6 to about 35, R is a substituted saturated hydrocarbon radical of up to 10 carbon atoms, wherein the number of substituents on the R group is represented by the value of "a", which is a number from 3 to 6. The alkylene groups in either formula III or IV may be straight or branched chain containing about 2 to 7, and preferably about 2 to 4 carbon atoms.

The above polyoxyalkylene polyamines, preferably polyoxyalkylene diamines and polyoxyalkylene triamines, may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weight ranging from about 200 to 2,000. The polyoxyalkylene polyamines are commercially available and may be obtained, for example, from the Jefferson Chemical Company, Inc. under the trace name "Jeffamines D-230,D-400, D-1000, D-2000, T-403", etc.

The polyamine is readily reacted with the lactone, with or without a catalyst, simply by heating a mixture of the lactone and polyamine in a reaction vessel in the absence of a solvent at a temperature of about 30° C. to about 200° C., more preferably to a temperature of about 75° C. to about 180° C., and most preferably at about 90° C. to about 160° C., for a sufficient period of time to effect reaction. Optionally, a solvent for the lactone, polyamine and/or adduct can be employed to control viscosity and or reaction rates.

In one preferred embodiment of the invention, a polyamine such as tetraethylene pentamine is employed in a ratio of about 10:1 to 0.1:1 based on the amount of lactone used in the reaction. However, it will be appreciated that the mole ratio of lactone to polyamine can be varied widely as a means for controlling the length of the sequence of lactone units in the adduct. In this latter regard, the mole ratio of lactone to polyamine may vary from about 10:1 to about 0.1:1, more preferably from about 4:1 to about 0.2:1, and most preferably from about 2:1 to about0.4:1.

Catalysts useful in the promotion of the lactone-polyamine reactions are selected from the group consisting of stannous octanoate, stannous hexanoate, stannous oxalate, tetrabutyl titanate, a variety of metal organic based catalyst acid catalysts and amine catalysts, as described on page 266, and forward in a book chapter authorized by R.D. Lundberg and E. F. Cox entitled, "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts of catalyst per one million parts by weight of the total reaction mixture.

The Polyol Material

Suitable polyol compounds which can be used to react with the $C_5$-$C_9$ lactone and with the hydrocarbyl substituted dicarboxylic acid material include aliphatic polyhydric alcohols containing up to about 100 carbon atoms and about 2 to about 10 hydroxyl groups. These alcohols can be quite diverse in structure and chemical composition, for example, they can be substituted or unsubstituted, hindered or unhindered, branched chain or straight chain, etc. as desired. Typical alcohols are alkylene glycols such as ethylene glycol, propylene glycol, trimethylene glycol, butylene glycol, and polyglycol such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, dipentaerythritol, tripentaerythritol, 9,10-dihydroxystearic acid, the ethyl ester of 9,10-dihydroxystearic acid, 3-chloro-1, 2-propanediol, 1,2 butanediol, 1,4-butanediol, 2,3-hexanediol, 2,3-hexanediol, pinacol, tetrahydroxy pentane, erythritol, arabitol, sorbitol, mannitol, 1,2-cyclohexanediol, 1,4-cyclohexanediol, 1,4-(2-hydroxyethyl)-cyclohexane, 1,4-dihydroxy-2-nitrobutane, 1,4-di(2-hydroxyethyl)-benzene, the carbohydrates such as glucose, rhamnose, mannose, glyceraldehyde, and galactose, and the like, amino alcohols such as di(2-hydroxyethyl)amine, tri-(3-hydroxypropyl)amine, N,N'-di-(hydroxyethyl)ethylenediamine, copolymer of allyl alcohol and styrene, N,N-di-(2-hydroxylethyl) glycine and esters thereof with lower mono- and polyhydric aliphatic alcohols, etc.

Included within the group of aliphatic alcohols are those alkane polyols which contain ether groups such as polyethylene oxide repeating units, as well as those polyhydric alcohols containing at least three hydroxyl groups, at least one of which has been esterified with a mono-carboxylic acid having from eight to about 30 carbon atoms such as octanoic acid, oleic acid, stearic acid, linoleic acid, dodecanoic acid, or tall oil acid. Examples of such partially esterified polyhydric alcohols are the mono-oleate of sorbitol, the mono-oleate of glycerol, the monostearate of glycerol, the di-stearate of sorbitol, and the di-dodecanoate of erythritol.

A preferred class of $C_5$-$C_9$ lactone derived dispersants are those prepared from aliphatic alcohols containing up to 20 carbon atoms, and especially those containing three to 15 carbon atoms. This class of alcohols includes glycerol, erythritol, pentaerythritol, dipentaerythritol, tripentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis(hydroxymethyl)-cyclohexanol, 1,10-decanediol, digitalose, and the like. The dispersants prepared from aliphatic alcohols containing at least three hydroxyl groups and up to fifteen carbon atoms are particularly preferred.

An especially preferred class of polyhydric alcohols for preparing the lactone derived dispersants of the present invention are the polyhydric alkanols containing three to 15, especially three to six carbon atoms and having at least three hydroxyl groups. Such alcohols are exemplified in the above specifically identified alcohols and are represented by glycerol, erythritol, pentaerythritol, mannitol, sorbitol, 1,2,4-hexanetriol, and tetrahydroxy pentane and the like.

In one preferred embodiment of the invention, a polyol, e.g., pentaerythritol is employed in a ratio of about 10:1 to 0.1:1, based on the amount of lactone used in the reaction. In practice, the ratio of lactone to polyol may vary considerable as a means of controlling the length of the sequence of the lactone units in the dispersant product. For example, the mole ratio of lactone to polyol may vary from about 10:1 to about 0.1:1, more preferable from about 5:1 to about 0.2:1, and most preferably from about 2:1, to about 0.4:1.

Catalysts useful in the promotion of the lactone-polyol reactions are the same as those which are useful in connection with the lactone-polyamine reactions discussed above. The catalyst may be added to the reaction mixture at a concentration level of from about 50 to about 10,000 parts of catalyst per one million parts by weight of the total reaction mixture.

The Amino Alcohol Material

Suitable amino alcohol compounds which can be reacted with the lactone and hydrocarbyl substituted dicarboxylic acid material include those containing up to about 50 total carbon atoms and preferably up to about 10 total carbon atoms, from about 1 to about 5 nitrogen atoms, preferably from 1 to 3 nitrogen atoms, and from about 1 to about 15 hydroxyl groups, preferably from 1 to about 5 hydroxyl groups. Preferred amino alcohols include the 2,2-disubstituted-2-amino-1-alkanols having from two to three hydroxy groups and containing a total of 4 to 8 carbon atoms. This amino alcohol can be represented by the formula:

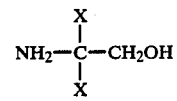

V wherein X is an alkyl or hydroxyalkyl group with the alkyl groups having from 1 to 3 carbon atoms wherein at least one, and preferably both, of the X substituents is a hydroxyalkyl group of the structure -$(CH_2)_n$OH, n being 1 to 3. Examples of such amino alcohols include: 2-amino-2-methyl-1,3 propanediol, 2-amino-2-ethyl-1,3-propanediol, and 2-amino-2-(hydroxymethyl) 1,3-propanediol, the latter also being known as THAM or tris (hydroxymethyl) amino methane. THAM is particularly preferred because of its effectiveness, availability and low cost.

In one preferred embodiment of the invention, an amino alcohol, e.g., THAM is employed in a mole ratio of about 10:1 to 0.1:1, based on the amount of lactone used in the reaction. It will be appreciated, however, that the mole ratio lactone to amino alcohol may be varied considerably and that the reaction product, in most cases, will comprise a mixture of adducts. In this latter regard, it is contemplated that the mole ratio of lactone to amino alcohol may vary from about 10:1 to about 0.1:1, more preferable from about 5:1 to about 0.5:1, and most preferably from about 2:1 to about 0.6:1.

Catalysts useful in the promotion of the lactone-amino alcohol reactions are the same as those which are useful in connection with the lactonepolyamine and lactone-polyol reactions, and corresponding amounts of catalyst may be employed.

The Acylating Agents

The acylating agents which may be reacted simultaneously with the lactone and with the polyamine, polyol and/or amino alcohol materials to form the dispersant additives of the invention are dicarboxylic acid materials, e.g., acid, anhydride or ester materials, which are substituted with a long chain hydrocarbyl group, generally a polyolefin, and which contain 0.7 to 2.0, preferably 1.00 to 1.5, e.g, 1.05 to 1.3 moles, per mole of polyolefin of an alpha or beta unsaturated $C_4$ to $C_{10}$ dicarboxylic acid or anhydride or ester thereof, such as fumaric acid, itaconic acid, maleic acid, maleic anhydride, chloromaleic acid, dimethyl fumarate, chloromaleic anhydride, etc.

Preferred olefin polymer substituents are polymers comprising a major molar amount of $C_2$ to $C_{10}$, e.g., $C_2$ to $C_5$ mono-olefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ diolefin, e.g., a copolymer of isobutylene and butadiene; or a copolymer of ethylene, propylene and 1,4-hexadiene; etc.

In some cases, the olefin polymer may be completely saturated, for example an ethylenepropylene copolymer made by a Ziegler-Natta synthesis using hydrogen as a moderator to control molecular weight.

The olefin polymers will usually have number average molecular weights within the rang of about 300 and about 10,000, more usually between 500 and about 7,000. Particularly useful olefin polymers have number average molecular weights within the range of about 500 and 3,000, and more preferable between about 900 and about 2,500, with approximately one terminal double per polymer chain. An especially useful olefin polymer for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information, see W.W..Yau, J.J. Kirkland and D.D. Bly, "Modern Size Exclusion Liquid Chromatography", John Wiley and Sons, New York, 1979.

Processes for reacting the olefin polymer with the $C_4$-$C_{10}$ unsaturated dicarboxylic acid, anhydride or ester to form the acylating agents to be used in this invention are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 wt. % chlorine, or bromine, based on the weight of polymer, by passing the chlorine or bromine through the polyolefin at a temperature of 100 to 250, e.g., 140° to 225° C. for about 0.5 to 10, preferably 1 to 7 hours. The halogenated polymer may then be reacted with sufficient unsaturated acid or anhydride at 100° to 250° C., usually about 140° to 180° C. for about 0.5 to 10, e.g., 3 to 8 hours, so the product obtained will contain about 1.0 to 1.5, preferably 1.06 to 1.20, eg., 1.10 moles of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 wt. % of the polyolefin, e.g., polyisobutylene will normally react with the dicarboxylic acid material. Upon carrying out a thermal reaction usually only about 50 to 75 wt. % of the polyisobutylene will react. Chlorination helps increase the reactivity. For convenience, the aforesaid functionality ratios of dicarboxylic acid producing units to polyolefin of 0.7 to 2.0 are based upon the total amount of polyolefin, that is, the total of both the reacted and unreacted polyolefin, used to make the product.

Reactions of the Lactone Material With Amines, Alcohols and Carboxylic Acids In order to form the lactone based dispersants of the present invention, the $C_5$–$C_9$ lactone material is reacted simultaneously with the acylating agent and with a polyamine, a polyol, an amino alcohol or a mixture thereof. This will result in a number of simultaneous and competing reactions whereby the lactone material, the acylating agent and the polyamine, polyol and/or amino alcohol react with each other to form a diversity of structures.

The simultaneous reaction of the reagent materials may be effected, in the presence or absence of a solvent and in the presence or absence of a catalyst, simply by heating the reaction mixture to about 100° C. to about 220° C., preferably from about 140° C. to about 190° C., and most preferably from about 160° C. to about 180° C., generally for 1 to 10, e.g., 2 to 6 hours until the desired amount of water is removed. Reaction ratios can vary considerably, depending upon the reactants, the amount of excess lactone, if any, the type bonds formed, etc. Generally, the ratio of lactone to acylating agent, or polyamine, or polyol, or amino alcohol is from about 10:1 to about 0.1:1.

In general, the chemistry of these competing reactions is known. However, prior to the present invention, there was no published information on the quantitative reaction rates of $C_5$–$C_9$ lactone, such as E-caprolactone, with polyamines, polyols, amino alcohols and acylating agents of the type discussed above. These data are very important when practical utilization of this chemistry for preparing dispersants is considered. This is due to the diversity of structures of amino group- and hydroxyl group-containing that are available. In one aspect of the invention, it has been found that the relative rate constants, for example, when reacting Ecaprolactone with various amines, alcohols and acids at 140° C. using 50 wt. % chlorobenzene as a solvent medium and with stoichiometric quantities of reagents, can be summarized as follows:

1. The rate constant for amino groups is much higher than the rate constant for hydroxyl groups;
2. The rate constant for primary amino or hydroxyl groups is very much higher than for secondary amino or hydroxyl groups;
3. The use of a catalYst, e.g., stannous octanoate increases the rate contant for primary amino groups by a factor of about 3, and increases the rate constant for primary hydroxyl groups of a factor of about 100; and
4. Acids are virtually unreactive with caprolactone.

Based on the above findings, it will be appreciated that when a $C_5$–$C_9$ lactone, such as E-caprolactone is heated simultaneously with a polyamine, such as 1,2-diaminoethane, and with an acrylating agent, such as polyisobutenyl succinic anhydride, the reaction mass will comprise a mixture of dispersants which contain a sequence of methylene units which is derived from the lactone reagents. In the case of E-caprolactone, which is a preferred lactone for use in this invention, the dispersant products will contain a sequence of five methylene units as illustrated schematically by the following equation: (It is to be understood that only one of a mixture of dispersant products is illustrated.)

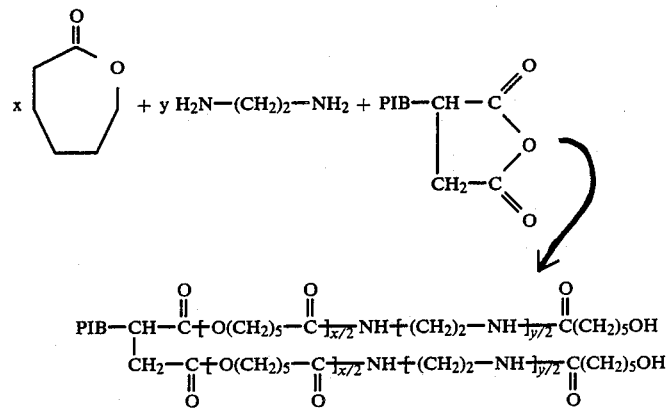

Eq. 3 where PIB is polyisobutylene having a molecular weight of 300–10,000 and there are 0.7–2.0 succinic anhydride moieties per polyisobutylene moiety.

In an alternative embodiment, the simultaenous reaction between E-caprolactone, a polyisobutenyl succinic anhydride acylating agent and a polyol, such as pentaerythritol can be illustrated as follows: (It is to be understood that only one of a mixture of dispersant products is illustrated)

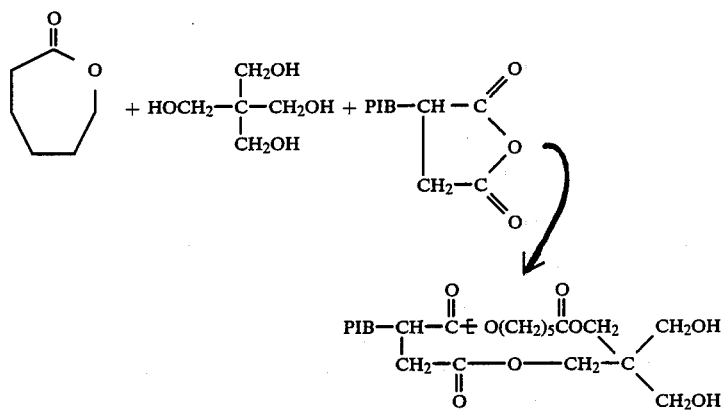

Eq. 4 where PIB the same as above.

In another alternative embodiment, the simultaneous reaction between E-caprolactone, a polyisobutenyl succinic anhydride and an amino alcohol such as tris (hydroxymethyl) amino methane can be illustrated as follows: (it is to be understood that only one of a mixture of dispersant products is illustrated.)

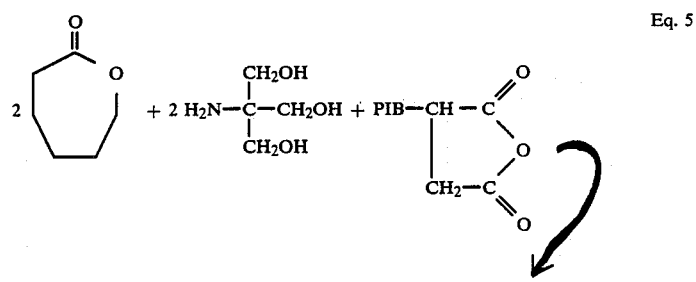

Eq. 5

-continued

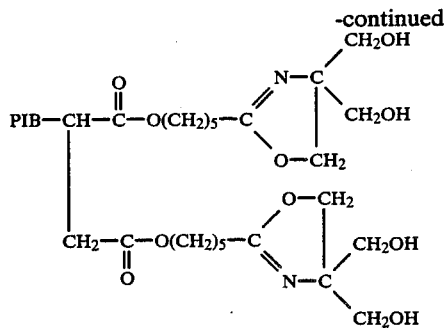

Although the chemistry of the lactone-polyamine, lactone-polyol and lactone-amino alcohol reactions are such that primary functional groups are more reactive than the secondary functional groups, it is possible that the secondary functional groups and the hydroxyl groups in the reaction products can react with additional lactone molecules to form a diversity of structures.

In the reactions discussed above, the average degree of polymerization (DP) of the lactone moiety i.e., the sequence of lactone units in a row in the reaction products, may vary depending upon the intended application. At DP's of much greater than about 10 the dispersants which are formed can exhibit crystallinity; a characteristic which is undesirable in an oil soluble dispersant due to the consequent high viscosity, or even solid, oil products which can be obtained. However, at lower DP's oil soluble adducts posessing low viscosity and desirable sludge and varnish inhibition characteristics are obtained. Accordingly, regardless of the identity of the lactone material, the average degree of polymerization (DP) should be between about 0.2 and about 100, more preferably between about 0.2 and about 50, and most preferably between 0.5 and about 20. For optimal dispersant performance sequences of from about 1 to about 5 lactone units in a row are preferred. The degree of polymerization can be controlled by controlling the reaction conditions, including the mole ratio of lactone material relative to the other reagents, amount of catalyst employed, and the like.

The dispersants of this invention other advantages over those dispersants which are prepared by first reacting the $C_5-C_9$ lactone with a polyamine, or polyol or amino alcohol to form an intermediate adduct, and then acylating the intermediate adduct. For example, in the case of the simultaneous reaction of the lactone material, a polyamine and an acylating agent, the reaction time is reduced since the postcapping is avoided. In the case of the simultaneous reaction of the lactone, polyol and acylating agent, the advantages are even more evident since the simultaneous reaction can take place at significantly lower temperatures than are required for the more conventional acylating agent/polyol/postcapping process. The simultaneous reaction process also results in less sediment formation than the conventional higher temperature process, and the resulting dispersants are characterized by lower viscosities than the corresponding acylating agent/polyol or acylating agent/polyol/lactone postcapping dispersants.

Further aspects of the present invention reside in the formation of metal complexes and other post-treatment derivatives, e.g. borated derivatives, of the novel additives prepared in accordance with this invention. Suitable metal complexes may be formed in accordance with known techniques of employing a reactive metal ion species during or after the simultaneous reaction of the lactone, acylating agent and polyamine, polyol or amino alcohol. Complex-forming metal reactants include the nitrates, thiocyanates, halides, carboxylates, phosphates, thiophosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. Nos. 3,306,908 and Re. 26,433.

Post-treatment compositions include those formed by reacting the novel additives of the present invention with one or more post-treating reagents, usually selected from the group consisting of boron oxide, boron oxide hydrate, boron halides, boron acids, sulfur chlorides, phosphorous sulfides and oxides, carboxylic acid or anhydride acylating agents, epoxides episulfides and acrylonitriles. The reaction of such post-treating agents with the novel $C_5-C_9$ lactone derived dispersant compounds of this invention is carried out using procedures known in the art. For example, boration may be accomplished in accordance with the teachings of U.S. Pat. No. 3,254,025 by treating a nitrogen-halide, ester or acid to provide about 0.1 to 1 atomic proportions of boron for each atomic proportion of nitrogen in the composition. Treatment may be carried out by adding about 1–3 wt % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

The Compositions

The lactone derived additives of the present invention have been found to possess very good dispersant properties as measured herein in a wide variety of environments.

Accordingly, the lactone derived adducts are used by incorporation and dissolution into an oleaginous material such as fuels and lubricating oils.

When the dispersants of this invention are used in normally liquid petroleum fuels such as middle distillates boiling from about 150° to 800° F., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, will usually be employed.

The lactone derived dispersants find their primary utility in lubricating oil compositions which employ a base oil in which the additives are dissolved or dispersed.

Such base oils may be natural or synthetic although the natural base oils will derive a greater benefit.

Thus, base oils suitable for use in preparing lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the dispersant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols, polyalphaolefins, alkyl benzenes, organic esters of phosphoric acids, polysilicone oil, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cs. at 100° C.

Thus, the lactone derived additives of the present invention can be employed in a lubricating oil composition which comprises lubricating oil, typically in a major amount, and the dispersant additive, typically in a minor amount, which is effective to impart enhanced dispersancy, relative to the absence of the additive. Additional conventional additives selected to meet the particular requirements of a selected type of lubricating oil composition can be included as desired.

The dispersants of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.01 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight base oil, based on the concentrate weight.

The lubricating oil base stock for the dispersant additives of the present invention typically is adapted to perform a selected function by the incorporation of additives therein to form lubricating oil compositions (i.e., formulations).

Representative additives typically present in such formulations include viscosity modifiers, corrosion inhibitors, oxidation inhibitors, friction modifiers, other dispersants, anti-foaming agents, ati-wear agents, pour point depressants, detergents, rust inhibitors and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound, interpolymers of styrene and acrylic esters, and styrene/isoprene copolymers.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N-(hydroxyalkyl)alkenylsuccinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional anti-wear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 235,920, filed Aug. 23, 1988, which is a continuation of Ser. No. 32,066, filed Mar. 27, 1987 (now abandoned), which, in turn, is a continuation of Ser. No. 754,001, filed July 11, 1985 (now abandoned), the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Vol % | Wt % a.i. |
|---|---|---|
| Viscosity Modifier | .01–4 | .01–4 |
| Corrosion Inhibitor | 0.01–1 | .01–1.5 |
| Oxidation inhibitor | 0.01–1 | .01–1.5 |
| Dispersant | 0.1–7 | 0.1–8 |
| Pour Point Depressant | 0.01–1 | .01–1.5 |
| Anti-Foaming Agents | 0.001–0.1 | .001–0.15 |
| Anti-Wear Agents | 0.001–1 | .001–1.5 |
| Friction Modifiers | 0.01–1 | .01–1.5 |
| Detergents/Rust Inhibitors | .01–2.5 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

This invention will be further understood by reference to the following examples, wherein all parts are parts by weight and all molecular weights and number average molecular weights unless otherwise noted, and which include preferred embodiments of the invention.

EXAMPLE 1

Polyisobutenyl Succinic Anhydride-Polyamine Reaction Product (Control)

About 324 g (0.2 mole) of a 59% a.i. polyisobutenyl succinic anhydride (PIBSA) derived from of polyisobutylene (PIB) having an average molecular weight of 1300 was diluted with 74 g of solvent 150 neutral mineral oil (S150N) and heated to 150° C. while under a nitrogen blanket. The PIBSA had an ASTM Saponification Number (SAP) of 103 which calculates to a succinic anhydride (SA) to polyisobutylene (PIB) ratio of 1.31 based upon the starting PIB as follows $$SA{:}PIB \text{ ratio} = \frac{SAP \times M_n}{112200 - (96 \times SAP)} =$$

$$\frac{103 \times 1300}{112200 - (96 \times 103)} = 1.32$$

Thereafter, 19.3 g (0.1 mole) of polyamine bottoms (PAM) was added slowly while stirring under a nitrogen blanket. This reaction was kept at 150° C. for two yours while stirring and nitrogen sparging to form a polyisobutenyl succinimide (PIBSI). The oil solution was filtered and collected. It analyzed for 1.59 wt. % nitrogen and had a viscosity of 508 SSU.

EXAMPLE 2

Post Reaction Polyisobutenyl Succinimide

To about 413 g of the polyisobutenyl succinimide prepared in accordance with Example 1, 4.13 g of E-caprolactone was added and the reaction mixture was heated to 150° C. for 2 hours. The reaction product analyzed for 1.54 wt % nitrogen and a viscosity of 505 SSU.

EXAMPLE 3

Simultaneous Reaction

About 324 g (0.2 mole) of the PIBSA used in Example 1, 19.3 g of polyamine bottoms, 74 g of S150N and 4.13 g of E-caprolactone were mixed in a reaction flask and heated to 150° C. while stirring under nitrogen blanket. The reaction mixture was held at 150° C. for 2 hours, and then stripped with a mild nitrogen stream for one half hour. The product was filtered and collected. It analyzed for 1.57 wt. % nitrogen and a viscosity of 523 SSU.

EXAMPLE 4

Polyisobutenyl Succinic Anhydride Polyol Reaction Product (Control)

About 200 g (0.1 mole) of a polyisobutenyl succinic anhydride (SAP 59.5, ai 82.2 wt. % active ingredient) derived from a PIB of average $M_n$ 1,900 was mixed with 14.3 g of S150N and 16.5 g (0.12 mole) of pentaerythritrol (PE) in the presence of 1.7 g of SA 117 (a commercially available alkyl sulfonic acid esterification catalyst). The reaction mixture was slowly heated to 210°-220° C. and kept at this temperature for 4-5 hours until the esterification was completed as evidenced by infrared analysis. The reaction product was stripped with nitrogen for one half hour, filtered and collected. It had a viscosity of 1485 SSU.

EXAMPLE 5

Post-Reacted Polyisobutenyl Succinate

About 358 g of the product prepared in Example 4 was mixed with 3.9 g of E-caprolactone and 0.2 g of stannous octanoate, and was heated to 150° C. for 2 hours. The product was then stripped with nitrogen and collected. It had a viscosity of 1614 SSU.

EXAMPLE 6

Simultaneous Reaction

About 200 g (0.1 mole) of the PIBSA employed in Example 4 was mixed with 16.5 g of PE, 3.9 g of E-caprolactone, and 0.2 g of stannous octanoate. The reaction mixture was then slowly heated to 180° C. It was observed that the PE went in solution at about 165° C. The reaction mixture was held at 180° C. for 2 hours and nitrogen stripped for one half hour. The reaction mixture was filtered, collected and analyzed for a viscosity of 895 SSU.

Samples of the dispersants prepared in accordance with Examples 1–6 were then subjected to a standard sludge inhibition bench test (SIB) and a standard varnish inhibition bench test (VIB)

The SIB and VIB tests forecast the performance of a lubricant in a gasoline engine. These tests are described below. The SIB test employs a used crankcase mineral lubricating oil composition having an original viscosity of about 325 SUS at 37.8° C. that has been used in a taxicab that is driven generally for short trips only, thereby causing a buildup of a high concentration of sludge precursors. The oil used contains only a refined base mineral oil, a viscosity index improver, a pour point depressant and zinc dialkyldithiophosphate antiwear additives. The oil contains no sludge dispersants. Such oil is acquired by draining and refilling taxicab crankcases at about 1,000–2,000 mile intervals.

The SIB test is conducted in the following manner: The used crankcase oil is freed of sludge by centrifuging for one half hour at about 39.000 gravities (gs). The resulting clear bright red oil is then decanted from the insoluble particles. However, the supernatant oil still contains oil-soluble sludge precursors which, under the conditions employed by this test, tend to form additional oil-insoluble deposits of sludge. The sludge inhibiting properties of the additives being tested are determined by adding to portions of the used oil 0.5 wt. % on an active basis, of the particular additive being tested. Ten grams of each one being tested is placed in a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the decanting supernatant oil and then carefully washed with 15 ml. of pentane to remove all remaining oils from the sludge. The weight, in milligrams, of the new solid sludge that forms in the test is determined by drying the residue and weighing it. The results are reported as milligrams of sludge per ten grams of oil thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

In the VIB test, a test sample consisting of ten grams of lubricating oil containing 0.5 wt. %, on an active basis, of the additive being evaluated is used. The test oil is a commercial lubricating oil obtained from a taxi after 2,000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance air is bubbled through the test samples and during the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS-VD engine tests which is described more fully hereinbelow.

Table I, which follows, summarizes the compositions tested and the test results:

TABLE I

| Example | Material | SA:PIB | wt. % N | PIB $M_n$ | Initial Viscosity SSU, 100° C. | SIB | VIB |
|---|---|---|---|---|---|---|---|
| 1 | Pibsa-PAM (control) | 1.31 | 1.59 | 1300 | 508 | 1.79 | 5½ |
| 2 | Pibsa-PAM CL (post reacted) | 1.31 | 1.54 | 1300 | 505 | 0.34 | 5 |
| 3 | Pibsa-PAM-CL (simultaneous) | 1.31 | 1.57 | 1300 | 523 | 0.28 | 5 |
| 4 | Pibsa-PE (control) | 1.06 | — | 1900 | 1485 | 0.77 | 2 |
| 5 | Pibsa-PE-CL (post-capped) | 1.06 | — | 1900 | 1614 | 4.03 | 2 |
| 6 | Pibsa-PE-CL (simultaneous) | 1.06 | — | 1900 | 895 | 1.34 | 2 |

The data in Table I indicate that the viscosity of the dispersant prepared by reacting PIBSA with PAM (Example 1) is comparable with the viscosity of the dispersants by post-reacting PIBSA-PAM with caprolactone (CL) (Example 2) or by simultaneously reaction PIBSA-PAM and CL (Example 3). However, the data show a marked improvement in sludge inhibition properties when caprolactone-derived moieties are present in the dispersant, particularly in the case of the dispersants formed by simultaneously reacting PIBSA, PAM and CL. The varnish inhibition properties are marginally improved for both CL-containing dispersants, and all of the dispersants are within commercially acceptable standards.

For the PIBSA-PE system, the data indicate that the dispersant prepared by simultaneously reacting PIBSA, PE and CL (Example 6) had a much lower viscosity than did either the control (Example 4) which did not contain any CL moieties or the post reacted product (Example 5). The SIB value for the product of this invention (Example 6), although somewhat higher than that of the control (Example 4, which contains no CL) is shown to be much lower than that of the post reacted product. The VIB values are excellent in all cases due to the sensitivity of the VIB test to polyol systems.

As will be evident to those skilled in the art, various modifications on this invention can be made or followed, in light of the foregoing disclosure and illustrative examples, tables and discussion, without departing from the spirit and scope of the disclosure or from the scope of the invention a set forth in the following claims.

What is claimed is:

1. A $C_5$-$C_9$ lactone derived material useful as an oil additive and formed by (1) simultaneously reacting at a temperature of from about 100 to about 220° C. for a period of from about 1 to about 10 hours a hydrocarbyl substituted $C_4$-$C_{10}$ dicarboxylic acid producing material with a $C_5$-$C_9$ lactone and a member selected from the group consisting of (a) a polyamine having from about 2 to 60 total carbon atoms and from about 2 to about 12 nitrogen atoms, (b) an aliphatic polyhydric alcohol containing up to about 100 carbon atoms and from about 2 to about 10 hydroxyl groups, (c) an amino alcohol containing up to about 50 total carbon atoms, from 1 to about 3 nitrogen atoms and from 1 to about 15 hydroxyl groups, or (d) mixtures thereof, and (2) post-treating the reaction product formed in step (1) with a boron reactant, said hydrocarbyl substituted acid producing material being formed by reacting an olefin polymer of a $C_2$-$C_{10}$ monoolefin having a number average molecular weight of about 300 to about 10,000 and a $C_4$-$C_{10}$ monounsaturated dicarboxylic acid material selected from the group consisting of acids, esters and anhydrides and containing an average of about 0.7 to about 2.0 molar equivalents of dicarboxylic acid producing moieties per molar equivalent of said olefin polymer, said $C_5$-$C_9$ lactone having undergone ring opening polymerization such that the degree of polymerization of said $C_5$-$C_9$ lactone in the final $C_5$-$C_9$ lactone derived material is from about 0.2 to about 100.

2. The $C_5$-$C_9$ lactone derived material of claim 1, wherein said olefin polymer is polyisobutylene.

3. The $C_5$-$C_9$ lactone derived material of claim 2, wherein said lactone is E-caprolactone.

4. The $C_5$-$C_9$ lactone derived material of claim 3, wherein said $C_4$-$C_{10}$ monounsaturated dicarboxylic acid material is maleic anhydride.

5. The $C_5$-$C_9$ lactone derived material of claim 4, wherein there are about 1 to about 1.5 succinic anhydride units per polyisobutenyl moiety present in said hydrocarbyl substituted C4-C10 dicarboxylic acid producing material and wherein the number average molecular weight of said polyisobutylene is from about 500 to about 3,000.

6. The C5-C9 lactone derived material of claim 1, wherein said C5-C9 lactone and said hydrocarbyl substituted C4-C10 dicarboxylic acid producing material are reacted with a polyamine, and wherein said polyamine is an aliphatic saturated amine having the formula:

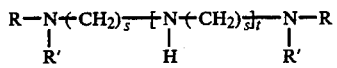

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provision that when t=0, at least one of R or R' must be H such that there are at least two of either primary or secondary amino groups.

7. The C5-C9 lactone derived material of claim 6, wherein said amine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine: di-(1, 2-propylene)triamine; di-(1,3-propylene) triamine; N, N-dimethyl-1,3-diaminopropane; N,N-di-(2-aminoethyl) ethylene diamine; and N-dodecyl-1,3-propane diamine.

8. The C5-C9 lactone derived material of claim 1, wherein said amine is selected from the group consisting alicyclic diamines, imidazolines, morpholines and N-aminoalkyl piperazines of the general formula:

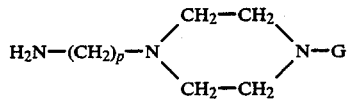

wherein G is independently selected from the group consisting of hydrogen and omega(nontertiary)-aminoalkylene radicals of from 1 to 3 carbon atoms, and p is a number of from 1 to 4.

9. The C5-C9 lactone derived material of claim 1, wherein said amine is a mixture of poly (ethyleneamines) averaging about 5 to about 7 nitrogen atoms per molecule.

10. The C5-C9 lactone derived material of claim 1, wherein said amine is a polyoxyalkylene polyamine having the formula:

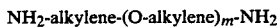

wherein m has a value of about 3 to 70: or

wherein n has a value of about 1 to 40 with the provision that the sum of all the n's is from about 3 to about 70, R is a substituted saturated hydrocarbon radical of up to 10 carbon atoms, wherein the number of substituents on the R group is represented by the value of "a", which is a number from 3 to 6.

11. The C5-C9 lactone derived material of claim 5, wherein said C5-C9 lactone and said hydrocarbyl substituted C4-C10 dicarboxylic acid producing material are reacted with a polyamine, and wherein said polyamine is an aliphatic saturated amine having the formula:

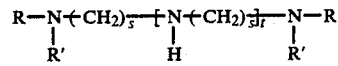

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when t=0, at least one of R or R' must be H such that there are at least two of either primary or secondary amino groups.

12. The C5-C9 lactone derived material of claim 11, wherein said amine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3-propylene) triamine; N, N-dimethyl-1,3-diaminopropane; N,N-di-(2-aminoethyl) ethylene diamine; and N-dodecyl-1,3-propane diamine.

13. The C5-C9 lactone derived material of claim 5, wherein said amine is selected from the group consisting alicyclic diamines, imidazolines, morpholines, and N-aminoalkyl piperazines of the general formula:

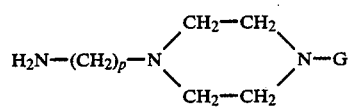

wherein G is independently selected from the group consisting of hydrogen and omega-(nontertiary)aminoalkylene radicals of from 1 to 3 carbon atoms, and p is a number of from 1 to 4.

14. The C5-C9 lactone derived material of claim 5, wherein said amine is a mixture of poly (ethyleneamines) averaging about 5 to about 7 nitrogen atoms per molecule.

15. The C5-C9 lactone derived material of claim 5, wherein said amine is a polyoxyalkylene polyamine having the formula:

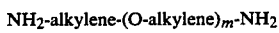

wherein m has a value of about 3 to 70: or

wherein n has a value of about 1 to 40 with the provisions that the sum of all the n's is from about to about 60, R is a substituted saturated hydrocarbon radical of up to 10 carbon atoms, wherein the number of substituents on the R group is represented by the value of "a", which is a number from 3 to 6.

16. The C5-C9 lactone derived material of claim 1, wherein the post-treatment is conducted with a boron oxide, boron oxide hydrate, boron halide, boron ester or boron acid.

17. The C5-C9 lactone derived material of claim 1, wherein said C5-C9 lactone and said hydrocarbyl substituted C4-C10 dicarboxylic acid producing material are reacted with a polyhydric alcohol.

18. The $C_5$–$C_9$ lactone derived material of claim 17, wherein said polyhydric alcohol is an aliphatic alcohol containing from 3 to 15 carbon atoms and at least three hydroxyl groups.

19. The $C_5$–$C_9$ lactone derived material of claim 18, wherein said polyhydric alcohol is a member selected from the group consisting of glycerol, erythritol, pentaerythritol, mannitol, sorbitol, 1,2,4 - hexanetriol and tetrahydroxy pentane.

20. The $C_5$–$C_9$ lactone derived material of claim 5, wherein said $C_5$–$C_9$ lactone is reacted with a polyhydric alcohol.

21. The $C_5$–$C_9$ lactone derived material of claim 20, wherein said polyhdric alcohol is an aliphatic alcohol containing from 3 to 15 carbon atoms and at least three hydroxyl groups.

22. The $C_5$–$C_9$ lactone derived material of claim 21, wherein said polyhydric alcohol is a member selected from the group consisting of glycerol, erythritol, pentaerythritol, mannitol, sorbitol, 1,2,4-hexanetriol and tetrahydroxy pentane.

23. The $C_5$–$C_9$ lactone derived material of claim 1, wherein said $C_5$–$C_9$ lactone and said hydrocarbyl substituted $C_4$–$C_{10}$ dicarboxylic acid producing material are reacted with an amino alcohol.

24. The $C_5$–$C_9$ lactone derived material of claim 23, wherein said amino alcohol is a 2,2-disubstituted-2-amino-1-alkanol of the formula

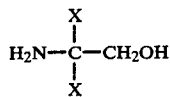

wherein X is alkyl or hydroxyalkyl group with the alkyl groups having from 1 to 3 carbon atoms, wherein at least one of the X substituents is a hydroxyalkyl group of the formula $-(CH_2)_nOH$, and wherein n is 1 to 3.

25. The $C_5$–$C_9$ lactone derived material of claim 24, wherein said amino alcohol tris (hydroxymethyl) amino methane.

26. The $C_5$–$C_9$ lactone derived material of claim 5, wherein said $C_5$–$C_9$ lactone is reacted with an amino alcohol.

27. The $C_5$–$C_9$ lactone derived material of claim 26, wherein said amino alcohol is a 2,2-disubstituted-2-amino-1-alkanol of the formula:

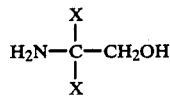

wherein X is alkyl or hydroxyalkyl group with the alkyl groups having from 1 to 3 carbon atoms, wherein at least one of the X substituents is a hydroxyalkyl group of the formula $—(CH_2)_nOH$, and wherein n is 1 to 3.

28. The $C_5$–$C_9$ lactone derived material of claim 27, wherein said amino alcohol comprises tris (hydroxymethyl) amino methane.

29. An oleaginous composition comprising (I) a lubricating oil and (II) a $C_5$–$C_9$ lactone derived material which has been prepared by first simultaneously reacting at a temperature of from about 100° to about 220° C. for a period of from about 1 to about 20 hours (i) a $C_5$–$C_9$ lactone, with (ii) a member selected from the group consisting of (a) a polyamine having from about 2 to about 60 total carbon atoms and from about 2 to about 12 nitrogen atoms, (b) an aliphatic polyhydric alcohol containing up to about 100 total carbon atoms and from about 2 to about 10 hydroxyl groups, and (c) an amino alcohol containing up to about 50 total carbon atoms, from 1 to about 3 nitrogen atoms and from 1 to 15 hydroxyl groups, and (d) mixtures of (a), (b) and (c), and with (iii) a hydrocarbyl substituted $C_4$–$C_{10}$ dicarboxylic acid producing material, and then post-treating the product obtained by reacting (i), (ii) and (iii) with a boron reactant; said hydrocarbyl substituted $C_4$–$C_{10}$ dicarboxylic acid producing material being formed by reacting an olefin polymer of a $C_2$–$C_{10}$ monoolefin having a number average molecular weight of from about 300 to about 10,000 with a $C_4$–$C_{10}$ monounsaturated dicarboxylic acid material and containing an average of from about 0.7 to about 2.0 dicarboxylic acid producing moieties per molecule of said olefin polymer, said $C_5$–$C_9$ lactone having undergone ring opening polymerization such that the degree of polymerization of said lactone in said final lactone derived material is from about 0.2 to about 100.

30. The oleaginous composition of claim 29, wherein said olefin polymer is polyisobutylene.

31. The oleaginous composition of claim 30, wherein said lactone is E-caprolactone.

32. The oleaginous composition of claim 31, wherein said $C_4$–$C_{10}$ monounsaturated dicarboxylic acid material is maleic anhydride.

33. The oleaginous composition of claim 32, wherein there are about 1 to about 1.5 succinic anhydride units per polyisobutenyl moiety present in said hydrocarbyl substituted $C_4$–$C_{10}$ dicarboxylic acid producing material and wherein the number average molecular weight of said polyisobutylene is from about 500 to about 3,000.

34. The oleaginous composition of claim 33, wherein said $C_5$–$C_9$ lactone and said hydrocarbyl substituted $C_4$–$C_{10}$ dicarboxylic acid producing material reacted with a polyamine, and wherein said polyamine is an aliphatic saturated amine having the formula:

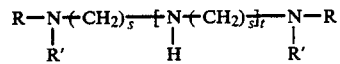

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals, each s is the same or a different number of from 2 to 6; and t is a number of from 0 to 10, with the provision that when t=0, at least one or R or R' must be H such that there are at least two of either primary or secondary amino groups.

35. The oleaginous composition of claim 34, wherein said polyamine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine: di-(1,2-propylene)triamine; di-(1,3-propylene) triamine; N,N-dimethyl-1,3-diaminopropane; N,N-di-(2-aminoethyl) ethylene diamine; and N-dodecyl-1,3-propane diamine.

36. The oleaginous composition of claim 33, wherein said polyamine is selected from the group consisting alicyclic diamines, imidazolines, morpholines, and N-aminoalkyl piperazines of the general formula:

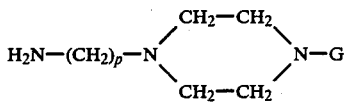

wherein G is independently selected from the group consisting of hydrogen and omega-(nontertiary)aminoalkylene radicals of from 1 to 3 carbon atoms, and p is a number of from 1 to 4.

37. The oleaginous composition of claim 33, wherein said polyamine is a mixture of poly (ethyleneamines) averaging about 5 to about 7 nitrogen atoms per molecule.

38. The oleaginous composition of claim 33, wherein said polyamine is a polyoxyalkylene polyamine having the formula:

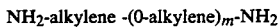

wherein m has a value of about 3 to 70: or

has a value of about 1 to 40 with the provision that the sum of all the n's is from about 3 to about 70, R is a substituted saturated hydrocarbon radical of up to 10 carbon atoms, wherein the number of substituents on the R group is represented by the value of "a", which is a number from 3 to 6.

39. The oleaginous composition of claim 33, wherein said $C_5$–$C_9$ lactone and said hydrocarbyl substituted $C_4$–$C_{10}$ dicarboxylic acid producing material are reacted with a polyhydric alcohol.

40. The oleaginous composition of claim 39, wherein said polyhdric alcohol is an aliphatic alcohol containing from 3 to 15 carbon atoms and at least three hydroxyl groups.

41. The oleaginous composition of claim 40, wherein said polyhydric alcohol is a member selected from the group consisting of glycerol, erythritol, pentaerythritol, mannitol, sorbitol, 1,2,4-hexanetriol and tetrahydroxy pentane.

42. The oleaginous composition of claim 33, wherein said $C_5$–$C_9$ lactone and said hydrocarbyl substituted $C_4$–$C_{10}$ dicarboxylic acid producing material are reacted with an amino alcohol.

43. The oleaginous composition of claim 42, wherein said amino alcohol is a 2,2-disubstituted- 2-amino-1-alkanol of the formula

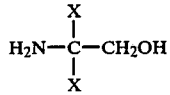

wherein X is alkyl or hydroxyalkyl group with the alkyl groups having from 1 to 3 carbon atoms, wherein at least one of the X substituents is a hydroxyalkyl group of the formula $-(CH_2)_nOH$, and wherein n is 1 to 3.

44. The oleaginous composition of claim 43, wherein said amino alcohol comprises tris (hydroxymethyl) amino methane.

45. The oleaginous composition of claim 29, wherein said post-treatment is conducted with a boron oxide, boron oxide hydrate, boron halide, boron ester or boron acid.

46. A lubricating oil composition comprising a major amount of a lubricating oil and about 0.01 to 15 wt. % of the $C_5$–$C_9$ lactone derived material of claim 3.

47. A lubricating oil comprising a major amount of lubricating oil and about 0.1 to 10 wt. % of the $C_5$–$C_9$ lactone derived material of claim 3.

48. A lubricating oil comprising a major amount of lubricating oil and about 0.1 to 10 wt. % of the $C_5$–$C_9$ lactone derived material of claim 5.

49. A lubricating oil comprising a major amount of lubricating oil and about 0.1 to 7 wt. % of the $C_5$–$C_9$ lactone derived material of claim 25.

50. A lubricating oil comprising a major amount of lubricating oil about 0.1 to 7 wt. % of the $C_5$–$C_9$ lactone derived material of claim 19.

51. A lubricating oil comprising a major amount of lubricating oil and about 0.1 to 10 wt. % of the $C_5$–$C_9$ lactone derived material of claim 6.

52. A lubricating oil comprising a major amount of lubricating oil about 0.1 to 10 wt % of the $C_5$–$C_9$ lactone derived material of claim 9.

53. A lubricating oil comprising a major amount of lubricating oil about 0.1 to 10 wt % of the caprolactone derived material of claim 18.

54. A lubricating oil comprising a major amount of lubricating oil about, 0.1 to 10 wt % of the caprolactone derived material of claim 24.

55. A lubricating oil comprising a major amount of lubricating oil about 0.1 to 10 wt % of the caprolactone derived material of claim 11.

56. A lubricating oil comprising a major amount of lubricating oil about 0.1 to 10 wt % of the caprolactone derived material of claim 14.

57. An oil soluble dispersant useful as an oil additive, comprising the product of a reaction mixture comprising:
(i) a hydrocarbyl substituted $C_4$–$C_{10}$ monounsaturated dicarboxylic acid producing material formed by reacting olefin polymer of $C_2$ to $C_{10}$ monoolefin having a number average molecular weight of about 300 to 10,000 and a $C_4$ to $C_{10}$ monounsaturated acid material, wherein said hydrocarbyl substituted dicarboxylic acid producing material contains an average of from about 0.7 to about 2.0 molar equivalents of dicarboxylic acid producing moieties per molar equivalent of said olefin polymer;
(ii) a $C_5$–$C_9$ lactone; and
(iii) at least one member selected from the group consisting of (a) a polyamine having from about 2 to 60 total carbon atoms and from about 2 to about 12 nitrogen atoms, (b) an aliphatic polyhydric alcohol containing up to about 100 total carbon atoms and from about 2 to about 10 hydroxyl groups, and (c) an amino alcohol containing up to about 50 total carbon atoms, from 1 to about 3 nitrogen atoms and from 1 to about 15 hydroxyl groups, wherein said reaction mixture has been heated at a temperature of from about 100 to about 220° C., for a period of from about 1 to about 10 hours, wherein the product of (i), (ii) and (iii) has been post-treated with a boron reactant, and wherein the degree of polymerization of said $C_5$–$C_9$ lactone in the product of (i), (ii) and (iii) is from about 0.5 to about 20.

58. An oil soluble dispersant according to claim 57, wherein said $C_5$–$C_9$ lactone is caprolactone.

59. An oil soluble dispersant according to claim 58, wherein said carpolactone and said hydrocarbyl substituted dicarboxylic acid producing material are reacted with a polyamine.

60. An oil soluble dispersant according to claim 59, wherein said polyamine is an aliphatic saturated amine having the general formula

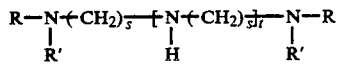

wherein R and R' independently are selected from the group consisting of hydrogen, $C_1$ to $C_{25}$ straight of branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals: each s is the same or a different number of from 2 to 6; and t is a number of from 0 to 10, with the provision that when t=0, at least one of R or R' must be H such that there are at least two of either primary of secondary amino groups.

61. An oil soluble dispersant according to claim 60, wherein said polyamine is selected from the group consisting of 1,2-diaminoethane: 1,3-diaminopropane; 1,4-diaminobutane; 1,6-diaminohexane; diethylene triamine; triethylene tetramine; tetraethylene pentamine; 1,2-propylene diamine; di(1,2-propylene)triamine; di-(1,3-propylene) triamine; N,N-dimethyl-1,3-diaminopropane; N,N-di-(2-aminoethyl) ethylene diamine; and N-dodecyl-1,3-propane diamine.

62. The oil soluble dispersant of claim 59, wherein said polyamine is selected from the group consisting of alicyclic diamines, imidazoles, morpholines, and N-aminoalkyl piperazines of the general formula:

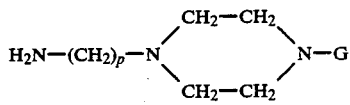

wherein G is independently selected from the group consisting of hydrogen and omega-(nontertiary)aminoalkylene radicals of from 1 to 3 carbon atoms, and p is a number of from 1 to 4.

63. The oil soluble dispersant of claim 59, wherein said polyamine is a mixture of poly(ethyleneamines) averaging about 5 to about 7 nitrogen atoms per molecule.

64. An oil soluble dispersant according to claim 55, wherein said polyamine is a polyoxyalkylene polyamine having the formula:

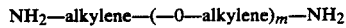

where m has a value of about 3 to 70; or

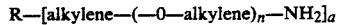

wherein n has a value of about 1 to 40 with the provision that the sum of all the n's is from about 3 to about 70, R is a substituted saturated hydrocarbon radical of up to 10 carbon atoms, wherein the number of substituents on the R group is represented by the value of "a", which is a number from 3 to 6.

65. An oil soluble dispersant according to claim 49, wherein said caprolactone and said hydrocarbyl substituted $C_4$–$C_{10}$ dicarboxylic acid producing material are reacted with a polyhydric alcohol.

66. An oil soluble dispersant according to claim 65, wherein said polyhydric alcohol is an aliphatic alcohol containing from 3 to 15 carbon atoms and at least three hydroxyl groups.

67. An oil soluble dispersant according to claim 66, wherein said polyhydric alcohol is a member selected from the group consisting of glycerol, erythritol, pentaerythritol, mannitol, sorbitol, 1,2,4-hexanetriol and tetrahydroxy pentane.

68. An oil soluble dispersant according to claim 58, wherein said caprolactone and said hydrocarbyl substituted $C_4$–$C_{10}$ dicarboxylic acid producing material are reacted with an amino alcohol.

69. An oil soluble dispersant according to claim 68, wherein said amino alcohol is a 2,2-disubstituted-2-amino-1-alkanol of the formula

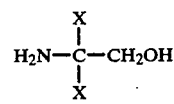

wherein X is a alkyl or hydroxyalkyl group with the alkyl groups having from 1 to 3 carbon atoms, wherein at least one of the X substituents is a hydroxyalkyl group of the formula $(CH_2)_nOH$, and wherein n is 1 to 3.

70. An oil soluble dispersant according to claim 69, wherein said amino alcohol is tris(hydroxymethyl)amino methane.

71. A oil soluble dispersant according to claim 57, wherein said post-treatment is conducted with a boron oxide, boron oxide hydrate, boron halide, boron ester or boron acid.

72. An oil soluble reaction product useful as an oil additive comprising:
(a) polymer consisting essentially of $C_2$ to $C_{10}$ monoolefin, said polymer being of 300 to 10,000 number average molecular weight and being substituted with succinic moieties selected from the group consisting of acid, anhydride and ester groups, wherein there are from about 0.7 to about 2.0 molar proportions of succinic moieties per molar proportion of said polymer,
(b) amine containing 2 to 60 carbon atoms and 2 to 12 nitrogen groups,
(c) $C_5$–$C_9$ lactone, wherein (a) (b) and (c) are reacted simultaneously at a temperature of from about 100 to about 220° C. for a period of from about 1 to about 10 hours, wherein there are about 0.2 to 100 molar proportions of (c) per molar proportion of said oil soluble reaction product, and,
(d) boron, wherein said boron has been introduced into said reaction product subsequent to the simultaneous reaction of (a), (b) and (c).

73. An oil soluble reaction product according to claim 72, wherein (a) is polyisobutylene of about 500 to 3,000 number average molecular weight substituted with succininc anhydride moieties, wherein (c) is E-caprolactone, and wherein there are about 0.5 to 20 molar proportions of (c) per molar proportion of said oil soluble reaction product.

74. An oil soluble reaction product according to claim 72, wherein said boron (d) has been introduced in said reaction product of (a), (b) and (c) by postreaction with a boron oxide, boron oxide hydrate, boron halide, boron ester or boron acid.

75. An oil soluble reaction product useful as an oil additive having improved dispersancy and viscosity characteristics of:
  (a) polymer consisting essentially of $C_2$ to $C_{10}$ monoolefin said polymer being of 300 to 10,000 number average molecular weight and being substituted with succinic moieties selected from the group consisting of acid, anhydride and ester groups wherein there are from about 0.7 to about 2.0 molar proportions of succinic moieties per molar proportion of said polymer,
  (b) aliphatic polyhydric alcohol containing up to about 100 total carbon atoms and from 2 to about 10 hydroxyl groups,
  (c) $C_5$–$C_9$ lactone, wherein (a) (b) (c) are reacted simultaneously at a temperature of from about 100 to about 220° C. for a period of from about 1 to about 10 hours and wherein there are about 0.2 to 100 molar proportions of (c) per molar proportion of said reaction product, and,
  (d) boron, wherein said boron has been introduced into said reaction product subsequent to the simultaneous reaction of (a), (b) and (c).

76. An oil soluble reaction product according to claim 75 wherein (a) is polyisobutylene of about 500 to 3,000 number average molecular weight substituted with succinic anhydride moieties, wherein (c) is E-caprolactone, and wherein there are about 0.5 to 20 molar proportions of (c) per molar proportion of said oil soluble reaction product.

77. An oil soluble reaction product according to claim 74 wherein said boron (d) has been introduced in said reaction product of (a), (b) and (c) by postreaction with a boron oxide, boron oxide hydrate, boron halide, boron ester or boron acid.

78. An oil soluble reaction product useful as an oil additive which comprises:
  (a) polymer consisting essentially of $C_2$ to $C_{10}$ monoolefin said polymer being of 300 to 10,000 number average molecular weight and being substituted with succinic moieties selected from the group consisting of acid, anhydride and ester groups wherein there are from about 0.7 to about 2.0 molar proportions of succinic moieties per molar proportion of said polymer,
  (b) amino alcohol containing up to about 50 total carbon atoms, from 1 to about 3 nitrogen atoms and from 1 to about 15 hydroxyl groups,
  (c) $C_5$–$C_9$ lactone, wherein (a) (b) and (c) are reacted simultaneously at a temperature of from about 100 to about 220° C. for a period of from about 1 to about 10 hours, and wherein there are about 0.2 to 100 molar proportions of (c) per molar proportion of said oil soluble reaction product, and,
  (d) boron, wherein said boron has been introduced into said reaction product subsequent to the simultaneous reaction of (a), (b) and (c).

79. An oil soluble reaction product according to claim 78 wherein (a) is polyisobutylene of abouyt 500 to 3,000 molecular weight substituted with succinic anhydride moieties, wherein (c) is E-caprolactone, and wherein there are about 0.5 to 20 molar proporation of (c) per molar proportion of said oil soluble reaction product.

80. An oil soluble reaction product according to claim 79, wherein said boron (d) has been introduced in said reaction product of (a), (b) and (c) by postreaction with a boron oxide, boron oxide hydrate, boron halide, boron ester or boron acid.

81. A lubricating crankcase motor oil composition for automotive vehicles and trucks comprising a major amount of lubricating oil; from about 0.01 to 15 wt. % of a dispersant formed by first simultaneously reacting at a temperature of from about 100° to about 220° C. for a period of from about 1 to about 10 hours (a) polyolefin substituted with a succinic acid or anhydride moieties with (b) a $C_5$–$C_9$ lactone and (c) at least one member selected from the group consisting of (i) polyamines having from about 2 to 60 total carbon atoms and from about 2 to about 12 nitrogen atoms, (ii), aliphatic polyhydric alcohols containing up to about 100 total carbon atoms and from about 2 to about 10 hydroxyl groups, and (iii) amino alcohols containing up to about 50 total carbon atoms, from 1 to about 3 nitrogen atoms and from 1 to about 15 hydroxyl groups, and then reacting the product of (a), (b) and (c) with a boron reactant, wherein said substituted succinic acid or anhydride has from about 0.7 to about 2.0 molar proportions of succinic moieties per molar proportion of polyolefin, wherein said polyolefin is a polymer of $C_2$ to $C_{10}$ monoolefin having a number average molecular weight of about 300 to 10,000 , and wherein said dispersant has about 0.2 to 100 molar proportions of lactone moieties per molar proportion of polyolefin; and about 3 to 25 wt. % of metal containing detergent additive.

82. A composition according to claim 81, wherein said polyolefin is polyisobutylene and wherein said $C_5$–$C_9$ lactone is caprolactone.

83. A composition according to claim 82 wherein said composition also contains an antiwear effective amount of a zinc dialkyldithiophosphate.

84. An additive concentrate comprising about 20 to 80 wt. % lubricating oil and 20 to 80 wt. % of a dispersant which is a $C_5$–$C_9$ lactone derived material formed by first simultaneously reacting at a temperature of from about 100 to about 220° C. for a period of from about 1 to about 10 hours (a) 0.2 to 100 molar proportions of a $C_5$–$C_9$ lactone per molar proportion of (b) at least one member selected from the group consisting of (i) polyamines having from about 2 to 60 total carbon atoms an from about 2 to about 12 nitrogen atoms, (ii) aliphatic polyhydric alcohols containing up to about 100 total carbon atoms and from about 2 to about 10 hydroxyl groups, and (iii) amino alcohols containing up to about 50 total carbon atoms, from 1 to about 3 nitrogen atoms and from 1 to about 15 hydroxyl groups, and (c) a hydrocarbyl substituted $C_4$–$C_{10}$ monounsaturated dicarboxylic acid producing material which was formed by reacting an olefin polymer of a $C_2$ to $C_{10}$ monoolefin having a number average molecular weight of about 300 to 10,000 with a $C_4$ to $C_{10}$ monounsaturated acid material and containing an average of from about 0.7 to about 2.0 dicarboxylic acid producing moieties per molecule of said olefin polymer, and then reacting the product of (a), (b) and (c) with a boron reactant.

85. A concentrate according to claim 84, wherein said dispersant is formed by reacting a polyisobutylene with maleic anhydride, and then reacting the polyisobutylene-maleic anhydride reaction product with said $C_5$–$C_9$ lactone and said member (b).

86. A concentrate according to claim 85, wherein said $C_5$–$C_9$ lactone is caprolactone and which also contains an effective amount of a viscosity modifier.

87. A concentrate according to claim 86 which also contains an anti-wear effective amount of a zinc dialkyldithiophosphate.

88. An additive concentrate comprising about 20 to 80 wt. % lubricating oil and about 20 to about 80 wt. % of an oil soluble reaction product of (a) caprolactone (b) a hydrocarbyl substituted $C_4$ to $C_{10}$ monounsaturated dicarboxylic acid producing material, (c) at least one member selected from the group consisting of polyamines having from about 2 to 60 total carbon atoms and form about 2 to about 12 nitrogen atoms, aliphatic polyhydric alcohol containing up to about 100 total carbon atoms and from about 2 to about 10 hydroxyl groups, and amino alcohols containing up to about 50 total carbon atoms, from 1 to about 3 nitrogen atoms and from 1 to about 15 hydroxyl groups, and (d) boron, wherein said reaction product has been prepared by first reacting (a), (b) and (c), at a temperature of from about 100° to about 220° C. for a period of from 1 to about 10 hours, followed by reaction with (d), wherein said hydrocarbyl substituted material has been formed by reacting an olefin polymer of a $C_2$ to $C_{10}$ monoolefin having a number average molecule weight of about 500 to 3,000 and a $C_4$ to $C_{10}$ monounsaturated acid or anhydride and containing an average of from about 0.7 to about 2.0 molar equivalents of dicarboxylic acid producing moieties per molar equivalent of said olefin polymer, and wherein there are from 0.5 to 20 molar proportions of caprolactone per molar proportion of said olefin polymer present in said reaction product.

89. An additive concentrate according to claim 88, wherein said hydrocarbyl substituted $C_4$ to $C_{10}$ acid producing material is polyisobutylene substituted with 1 to 1.5 moles of succinic anhydride units per mole of polyisobutylene.

90. An additive concentrate according to claim 89, which also contains an effective amount of a viscosity modifier.

* * * * *